United States Patent
Begley et al.

(10) Patent No.: US 7,542,468 B1
(45) Date of Patent: Jun. 2, 2009

(54) DYNAMIC HOST CONFIGURATION PROTOCOL WITH SECURITY

(75) Inventors: James Brian Sullivan Begley, Tampa, FL (US); Tony Thomas, Tampa, FL (US); Franz Badias, Odessa, FL (US)

(73) Assignee: Intuit Inc., Mountain View, CA (US)

( * ) Notice: Subject to any disclaimer, the term of this patent is extended or adjusted under 35 U.S.C. 154(b) by 569 days.

(21) Appl. No.: 11/253,434

(22) Filed: Oct. 18, 2005

(51) Int. Cl.
| H04L 12/28 | (2006.01) |
| H04L 12/56 | (2006.01) |
| H04L 9/32 | (2006.01) |
| G06F 15/173 | (2006.01) |
| G06F 15/16 | (2006.01) |
| G06F 7/04 | (2006.01) |
| G06F 17/30 | (2006.01) |
| G06K 9/00 | (2006.01) |

(52) U.S. Cl. .................. 370/389; 709/225; 709/245; 726/4

(58) Field of Classification Search ............ 370/241, 370/389; 380/270; 709/221, 223, 225, 227, 709/245; 726/2, 3, 4, 21, 27, 28, 29
See application file for complete search history.

(56) References Cited

U.S. PATENT DOCUMENTS

| 6,393,484 | B1 * | 5/2002 | Massarani .................. 709/227 |
| 6,452,925 | B1 * | 9/2002 | Sistanizadeh et al. ........ 370/352 |
| 6,753,887 | B2 * | 6/2004 | Carolan et al. .............. 715/764 |
| 7,143,435 | B1 * | 11/2006 | Droms et al. .................. 726/3 |
| 7,184,418 | B1 * | 2/2007 | Baba et al. .................. 370/331 |
| 7,367,046 | B1 * | 4/2008 | Sukiman et al. ................ 726/2 |
| 2002/0075844 | A1 * | 6/2002 | Hagen ........................ 370/351 |
| 2003/0167411 | A1 * | 9/2003 | Maekawa .................... 713/201 |
| 2004/0107364 | A1 * | 6/2004 | Shin ........................... 713/201 |
| 2004/0177133 | A1 * | 9/2004 | Harrison et al. ............. 709/220 |
| 2004/0185777 | A1 * | 9/2004 | Bryson ...................... 455/41.1 |
| 2005/0048950 | A1 * | 3/2005 | Morper ...................... 455/410 |
| 2005/0188063 | A1 * | 8/2005 | Finley et al. ................ 709/221 |
| 2005/0198374 | A1 * | 9/2005 | Suzuki ....................... 709/238 |
| 2005/0220099 | A1 * | 10/2005 | Igarashi ...................... 370/389 |
| 2005/0234954 | A1 * | 10/2005 | Bailey et al. ................ 707/101 |
| 2006/0015714 | A1 * | 1/2006 | Hirano et al. ................ 713/151 |
| 2006/0031394 | A1 * | 2/2006 | Tazuma ....................... 709/217 |
| 2006/0036733 | A1 * | 2/2006 | Fujimoto et al. ............ 709/225 |
| 2006/0129677 | A1 * | 6/2006 | Tamura ...................... 709/227 |
| 2006/0187861 | A1 * | 8/2006 | West et al. ................... 370/260 |
| 2006/0248229 | A1 * | 11/2006 | Saunderson et al. ......... 709/245 |
| 2007/0002833 | A1 * | 1/2007 | Bajic ........................... 370/352 |
| 2007/0061484 | A1 * | 3/2007 | Droms et al. ................ 709/245 |

* cited by examiner

*Primary Examiner*—Jayanti K Patel
*Assistant Examiner*—Hoang-Chuong Q Vu
(74) *Attorney, Agent, or Firm*—Park, Vaughan & Fleming LLP

(57) ABSTRACT

A request from a user of a computer device to gain access to a communication network is routed to a captive web portal running on a Dynamic Host Configuration Protocol (DHCP) server where the device has a media access control (MAC) address that is not known to the DHCP server, rather than being routed to a DNS server that provides domain name resolution or network resources. The captive web portal prompts a user of the computer device to provide authentication information. If the user is authenticated, the DHCP server provides an actual internet protocol (IP) address that uniquely identifies the computer device on a network supporting TCP/IP and provides access to network resources.

15 Claims, 5 Drawing Sheets

You have authenticated successfully!

Please do the following:

Open command prompt

1. Start > Run
2. Type in CMD click enter
3. Type in ipconfig/release
4. Type in ipconfig/renew
5. Close the command prompt Refresh you webpage. You should be able to communicate normally

DYNAMIC HOST CONFIGURATION PROTOCOL WITH SECURITY

BACKGROUND

The present invention relates generally to network security systems.

Corporate computer networks are increasingly vulnerable to attacks from intruders. Hackers, viruses, vindictive employees, and even human error pose danger to corporate networks. Wireless networking technologies provide convenience and mobility, but they also introduce security risks on a network. For example, unless authentication and authorization mechanisms are implemented, anyone who has a compatible wireless network adapter can access the network.

To provide a uniform solution for preventing unauthorized devices from gaining access to networks, 802.1X, a Switch Port-Based Network Access Control standard was created by the Institute of Electrical and Electronic Engineers (IEEE), and governs access to wired and wireless networks. The 802.1X standard provides support for centralized user identification, authentication, dynamic key management, and accounting. According to the standard, a user of a client device is asked to provide authentication information to a security server. The security server authenticates the user based on the provided information and authorizes access to the network if the user is authenticated.

Although 802.1X protocol is widely used by large corporations, configuring a network switch with the 802.1X protocol remains a very cumbersome and complicated task, which is often beyond the expertise of most network administrators in small to mid-level businesses. In addition, implementing the protocol requires having a separate component, such as a RADIUS server.

A Dynamic Host Configuration Protocol (DHCP) is another known mechanism for providing access to networks. According to the DHCP, when a device sends a request to an IP address, a system that executes the DHCP assigns an IP address to the requesting device. Existing systems that implement the DHCP, however, do not provide any security features. As a result, an authorized device can gain access to networks.

SUMMARY

In various embodiments, the present invention provides methods, systems, and a computer program product for authenticating a user of a client device prior to providing access to a network. In one aspect of the invention, a client device issues a request to gain access to a communication network, for example a request for a network resource, a web page, an application or the like. Successfully connecting to these resources requires the client device to have a valid IP address. Thus, the request is received by a Dynamic Host Configuration Protocol (DHCP) server. The request includes a media access control (MAC) address. A DHCP security agent executed on the DHCP server routes the request to a captive web portal running on the DHCP server if the device has a media access control (MAC) address that is not known to the DHCP server. The captive web portal prompts a user of the computer device to provide authentication information. If the DHCP security agent authenticates the user, the DHCP server provides an actual Internet Protocol (IP) address that uniquely identifies the computer device on a network supporting TCP/IP. This allows the computer device to subsequently obtain access to the requested resource. Thus, a web page request originating from the client device that is not known to the DHCP server is redirected to a captive web portal running on the DHCP server rather than being routed to a domain name server (DNS) that provides domain name resolution. Where the device has a media access control (MAC) address that is known to the web server, then the request is routed to a DNS that provides domain name resolution and returns the IP address of the requested resource.

The DHCP server is configured to maintain a range of actual IP addresses that are leased to requesting computer devices whose MAC address is known to the DHCP server. The DHCP server is also configured to maintain a range of fictitious IP addresses leased to requesting computer devices whose MAC address is not known to the DHCP server. A fictitious IP address identifies a computer device on a fictitious network. The fictitious IP address allows the computer device to route its requests only within the fictitious network.

The features described in this summary and the following detailed description are not all-inclusive. Many additional features will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 5 is an exemplary user interface presented to a user after the user has been authenticated.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention provides various systems and methods that prevent unauthorized access to a computer network. The following describes the operation of an embodiment of the invention by way of introductory example. A user at the computer device attempts to access a communication network. The computer device issues a request. The DHCP server listens for requests and identifies, from the request, a MAC address of the sending computer device. If the MAC address is known to the DHCP server, a DHCP security agent executed on the DHCP server invokes the DHCP to make a lease offer in the form of an IP address block that includes, among other components, an actual IP address of the requesting device, an address of a DNS server, and an address of the DHCP server.

If the MAC address is not known to the DHCP server, the DHCP security agent invokes the DHCP to make a lease offer in a form of a fictitious IP address block. The fictitious IP address block includes a fictitious IP address leased to the requesting computer device, a fictitious IP address of the DHCP server, and an address of a DNS server. In the fictitious IP address block, the address of the DNS server is replaced with a fictitious IP address of the DHCP server. As a result, when a user of the client device refreshes a web browser, a web request is routed to the DHCP server. The DHCP server publishes a login authentication page that prompts a user of the computer device to provide authentication information. Thus, rather than routing web requests originated from the computer device to a DNS server that provides domain name resolution and returns an IP address of the requested web page, the web request from a new user is redirected to an authentication login page running on the DHCP server.

Once the user is authenticated, the DHCP server adds the MAC address of the computer device to a database that stores MAC addressees of known devices. The DHCP server then asks the user to execute a release and renew procedure, thereby releasing the fictitious IP address and requesting a valid IP address. The DHCP security agent identifies the MAC address as a known device and issues an actual IP address to the computer device. In addition, because the client device is authorized, DHCP security agent sends other IP information need for communication with the Internet as well as resolution to other network resources.

The following sections further describe various embodiments of the invention.

System Architecture

Figure 1:
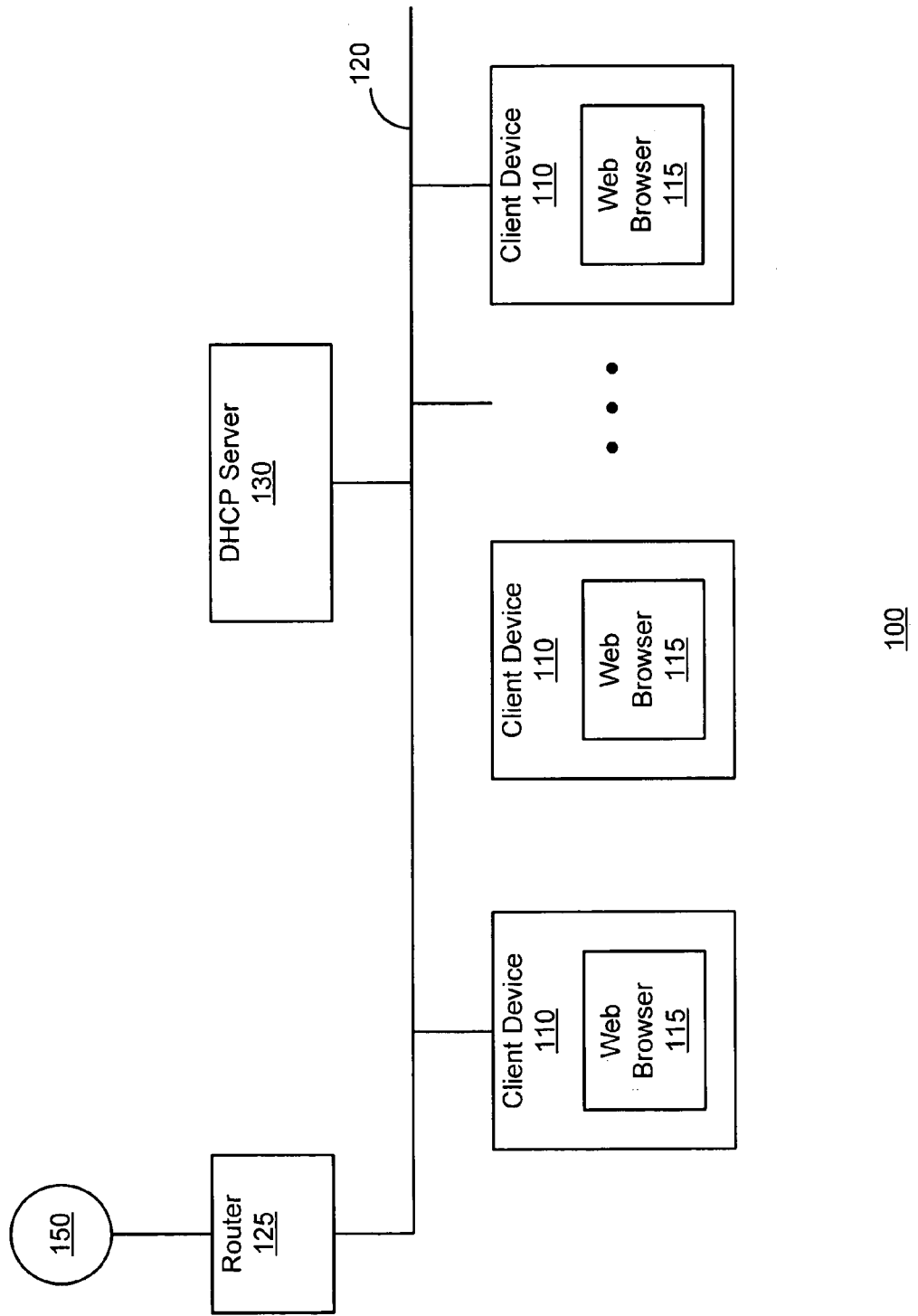
FIG. 1 is a block diagram of environment in which one embodiment of the invention operates.

FIG. 1 is a block diagram of environment 100 in which one embodiment of the invention operates. Environment 100 includes a plurality of client devices 110 associated with users. A client device 110 is either already has been granted access to communication network 120 or is attempting to access communication network 120. Environment 100 further includes a DHCP server 130 residing on communication network, e.g., 120.

Client devices 110 represent computer nodes, which, when connected to communication network, e.g., 120, can share access to various software and hardware resources on communication network 120, can communicate with other client devices 110 connected to communication network 120, or access the Internet 150. The client device 110 can include a processor, an addressable memory, and other features (not illustrated) such as a display, local memory, input/output ports, and a network interface. One or more components of the client device 110 may be located remotely and accessed via a network. The network interface and a network communication protocol provide access to a network 120 and other client devices 110, along with access to the Internet 150, via a TCP/IP type connection, or to other network embodiments, such as a LAN, a WAN, a MAN, a wired or wireless network, a private network, a virtual private network, or other networks. In various embodiments, the client device 110 may be implemented on a computer running a Microsoft operating system, Mac OS, various flavors of Linux, UNIX, Palm OS, and/or other operating systems. Client devices 110 can be workstations, personal computers, handheld devices, or any other devices that employ web-browsing functionality. Users of client devices 110 can be any individuals seeking authorization to access communication network, e.g. 120.

Client devices 110 execute a web browser 115 for interpreting display instructions in the web page and displaying the content accordingly. Web browser 115 includes additional functionality, such as a Java Virtual Machine, for executing JAVA® applets, ActiveX®, Flash®, and/or other applet or script technologies as available now or in the future. A client device 110 has a Media Access Control (MAC) address that is burned into a network interface card of the client device 110.

Communication network 120 can be a local area network (LAN), wide area network (WAN), intranet of any size, or any other corporate network that is capable of supporting communication between client devices 110 and DHCP server 130.

DHCP server 130 executes the Dynamic Host Configuration Protocol (DHCP). DHCP server 130 is adapted to intercept a web request from client device 110 and redirect the request to an authentication login page running on the DHCP server 130 if the client device 110 has a MAC address not known to the DHCP server 130. Various components of the DHCP server 130 are described in more detail below in reference to FIG. 2.

Router 125 is a device that forwards IP packets sent by client devices 110 along communication network 120 and Internet 150.

Figure 2:
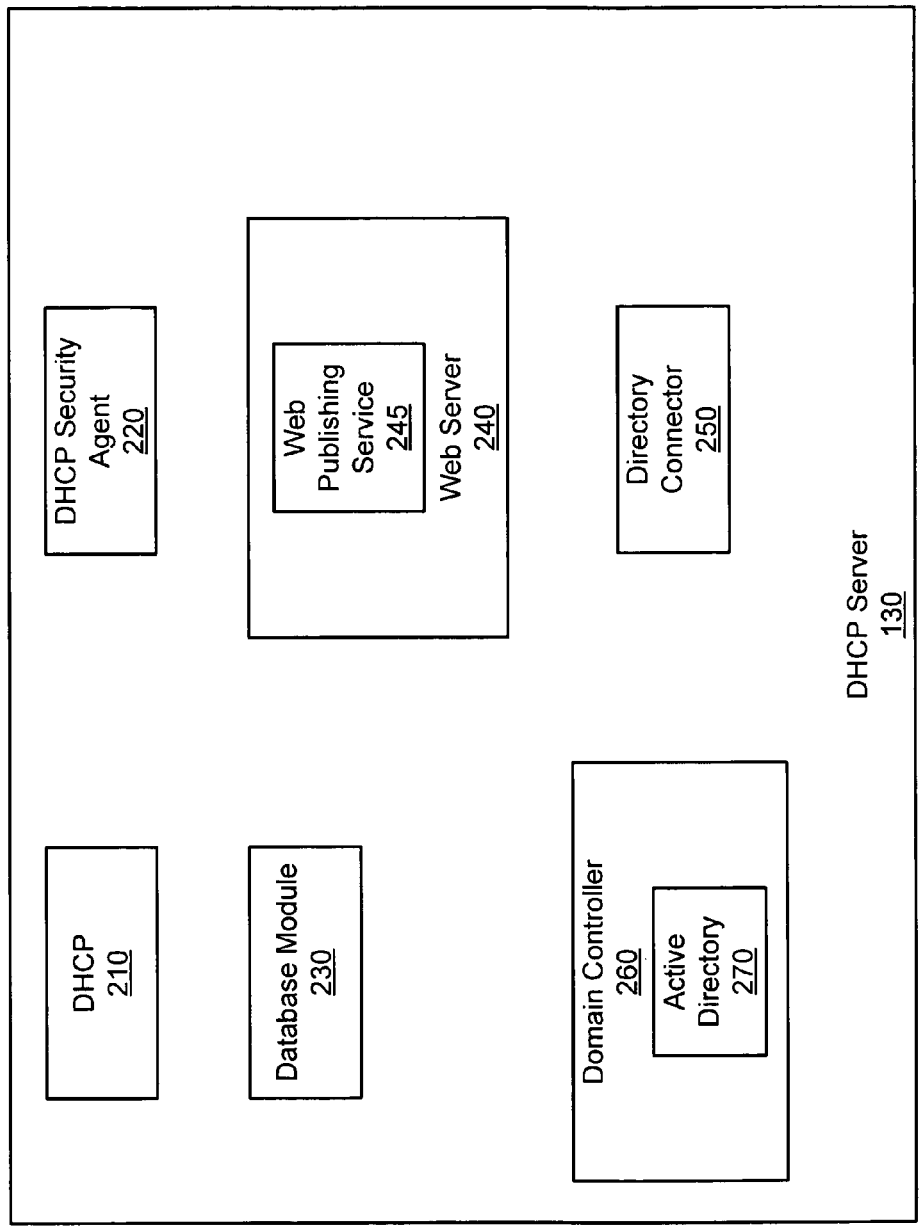
FIG. 2 is a block diagram of one embodiment of the components of a DHCP server shown in FIG. 1 for performing the functionality of the present invention.

FIG. 2 is a block diagram of the components of DHCP server 130 adapted to perform authentication of a user of client device 110 that attempts to access communication network 120 or the Internet 150. DHCP server 130 includes a web infrastructure, such as a web server 240. The web server 240 executes a web publishing service 245 for publishing web pages. In one embodiment, the web publishing service 245 publishes an authentication web page that prompts a user of client device 110 to provide authentication information, such as a user name and password. Web publishing service 245 is, for example, Microsoft Internet Information Server (IIS), Apache, or any other system adapted to publish web pages.

As was previously described, DHCP server 130 also executes the DHCP 210, a DHCP security agent 220, a database module 230, a domain controller 260, an active directory 270, and a directory connector 250. The term "module" refers to computer program code and/or hardware adapted to provide the functionality attributed to the module, and which may have any type of implementation, for example, as a library file, script, object code, class, package, applet, and so forth.

Database module 230 is one example of a means for storing MAC addresses of client devices 110 authorized to access communication network 120. Database module 230 also stores a range of actual IP addresses and a range of fictitious IP addresses dynamically allocated by DHCP 210.

DHCP security agent 220 is one example of a means for authenticating a user of client device 110 prior to providing access to communication network, e.g., 120 or the Internet 150. DHCP security agent 220 is adapted to receive a request from client device 110, for example, a request for a network resource, a web page, an application, or the like. DHCP security agent 220 identifies a MAC address in the request and invokes DHCP 210 to assign an actual IP address to client device 110 or a fictitious IP address depending on whether the MAC address of the client device 110 is known to DHCP server 130. An actual IP address is an address that uniquely identifies a client device 110 on communication network 120 and the Internet 150 and allows client devices 110 to access network resources. A fictitious IP address is an address that does not allow client device 110 to access communication network 120 or the Internet 150.

In one embodiment, DHCP security agent 220 is part of DHCP 210. In another embodiment, DHCP security agent 220 and DHCP 210 are two different entities. One embodiment of the method performed by DHCP security agent 220 is described in more detail below with reference to FIG. 3.

DHCP 210 is adapted to automatically assign actual IP addresses or fictitious IP addresses to client devices 110 based on the logic executed by DHCP security agent 220.

Active directory 270 is one example of a means for storing authentication information, such as user name and password.

Domain controller 260 is one example of a means for receiving, from DHCP security agent 220, authentication information provided by a user of client device 110 and performing a lookup in active directory 270 to determine whether provided authentication information is stored in active directory 270.

Domain controller 260 is one example of a means for providing an indication as to whether an access to communication network 120 can be granted to a user of client device 110.

Directory connector 250 is one example of a means for connecting DHCP security agent 220 with domain controller 260.

Example Methods of Operation

Figure 3:
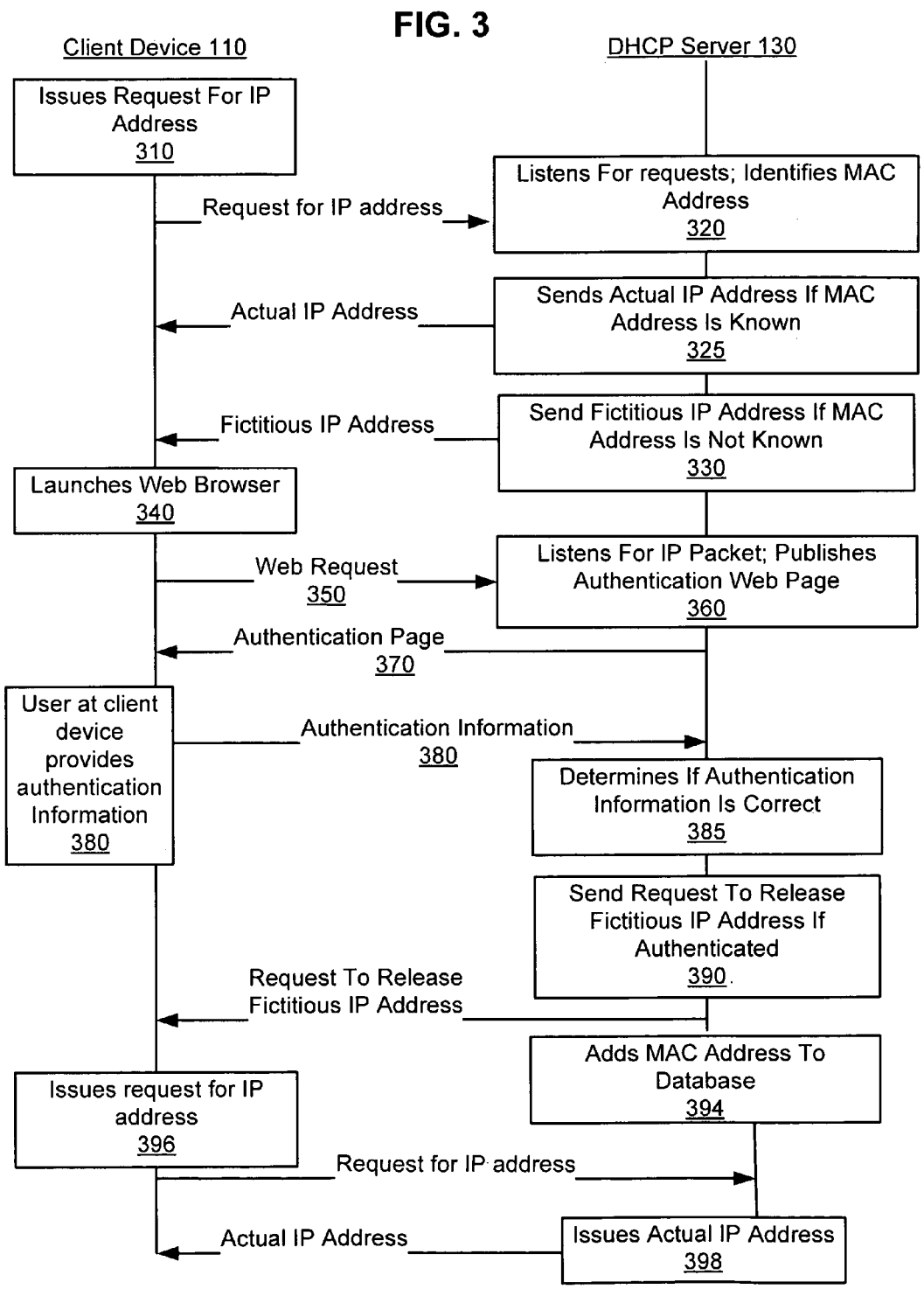
FIG. 3 is an event diagram of a method performed by the components of the DHCP server according to an embodiment of the present invention.

FIG. 3 is an event diagram illustrating exemplary transactions performed by client device 110 and DHCP server 130 to authorize users' of client devices 110 to access communication network 120. In FIG. 3, these entities are listed across the top. Beneath each entity is a vertical line representing the passage of time. The horizontal arrows between the vertical lines represent communication between the associated entities. It should be noted that not every communication between the entities is shown in FIG. 3. In other embodiments of the present invention, the order of the communication can vary.

According to one embodiment of the present invention, DHCP server 130 is configured to maintain a range of actual IP addresses that are leased to requesting client devices 110 whose MAC address is known to the DHCP server 130. An actual IP address uniquely identifies client device 110 on a network that supports TCP/IP protocol. An actual IP address has two parts—the first part identifies a particular network on the Internet 150 and the second part identifies a device within the network. Thus, the first part of the actual IP address identifies communication network 120 and the second part identifies client device 110 within communication network 120. An actual IP address allows client device 110 to communicate with other devices on communication network 120 as well as access the Internet 150.

The DHCP server 130 is also configured to maintain a range of fictitious IP addresses leased to those computer devices whose MAC address is not known to the DHCP server 130. A fictitious IP address similarly has two parts. The first part identifies a fictitious network and the second part identifies those devices that are within the fictitious network. A fictitious IP address does not allows client device 110 to communicate with other devices on communication network or to access the Internet 150. A fictitious network is a network on which client devices 110 having a fictitious IP address can communicate.

DHCP server 130 also has a fictitious IP address on the fictitious network.

According to this embodiment, initially a user of client device 110 attempts to access communication network 120 or the Internet 150 to perform various functions, such as access network resources, communicate with other client devices 110 via an electronic mail system, or access the Internet 150. Client device 110 sends 310 a request for an IP address. The request includes an address of the originating device, e.g., the MAC address of the client device 110. DHCP security agent 220 listens 320 to requests and identifies the MAC address in the request. DHCP security agent 220 uses the MAC address to perform a lookup in database module 230 to determine whether the MAC address is stored in the database module 230.

If the MAC address is stored in the database module 230, DHCP security agent 220 invokes DHCP 210 to make an IP address lease offer 325 in the form of an IP address block. The IP address block includes an actual IP address for the requesting client device 110, a netmask, an address of a default gateway, a DNS server address, and an actual IP address of DHCP server 130. An exemplary actual IP address block sent by DHCP 210 is shown below:
   IP address 10.3.0.65
   Netmask address 255.255.255.0
   Default Gateway address
   DHCP Server address 10.3.1.10
   DNS Server address 10.3.1.252

In the examplary IP address block, the actual IP address is assigned to the requesting client device 110. The first three octets ("10.3.0") represent the address of the communication network 120. The last number ("65") is a host IP address of the client device 110. Similarly, the first three octets of the IP address of DHCP server 130 represent the address of the communication network 120. The last octet ("10") is a host IP address of DHCP server 130. Default Gateway address can be left blank as it is not needed.

DHCP 210 marks the leased IP address of the client device 110 as unavailable in database module 230. The client device 110 uses the IP address to access communication network 120 and the Internet 150. When the client device 110 issues a web request, the request has the following components: an actual IP address of the originating device, a payload, and a destination address of the receiving device. The request is routed to the DNS server identified by the address in the IP address block. The DNS provides address name resolution and returns an IP address of the requested web page.

If upon the lookup of the database module 230, DHCP security agent 220 does not find the MAC address of the requesting client device 110, DHCP security agent 220 invokes DHCP 210 to send 330 an IP address block with fictitious IP addresses. The IP address block with fictitious IP addresses has the following components: a fictitious IP address leased to the requesting client device 110, a fictitious IP address of DHCP server 130, and an address of a DNS server, which is replaced with the fictitious IP address of DHCP server 130.

An exemplary IP address block sent by DHCP security agent 220 to client device 110 is shown below:
   IP address 5.3.1.65
   Netmask address 255.255.255.0
   Default Gateway address 10.3.0.1
   DHCP Server address 5.3.1.01
   DNS Server address 5.3.1.01

In the examplary IP address block, the first three octets of the DHCP server 130 address represent a fictitious network address. The last octet is a fictitious host IP address of DHCP server 130. Similarly, the first three octets ("5.3.1") represent a fictitious network address. In the IP address block, the DNS server address is replaced with the fictitious address of the DHCP server 130. As a result, when a web request is originated from client device 110 whose MAC address is not known to DHCP server 130, the request is redirected from the requested web site to a login authentication page (also known as a captive web portal) at the DHCP server 130 identified by the fictitious IP address.

At step 340, a user of client device 110 launches web browser 115 to access communication network 120 or the Internet 150. As a result, a web request 350 is sent 350. The web request 350 includes the following data: a fictitious IP address of the originating device, a payload (such as a domain name), an address of a DNS server (in this case, the DNS server address is a fictitious address of DHCP server 130), and a signature of the IP packet (e.g., port 80 through which all web requests are received by web server 240).

Figure 4:
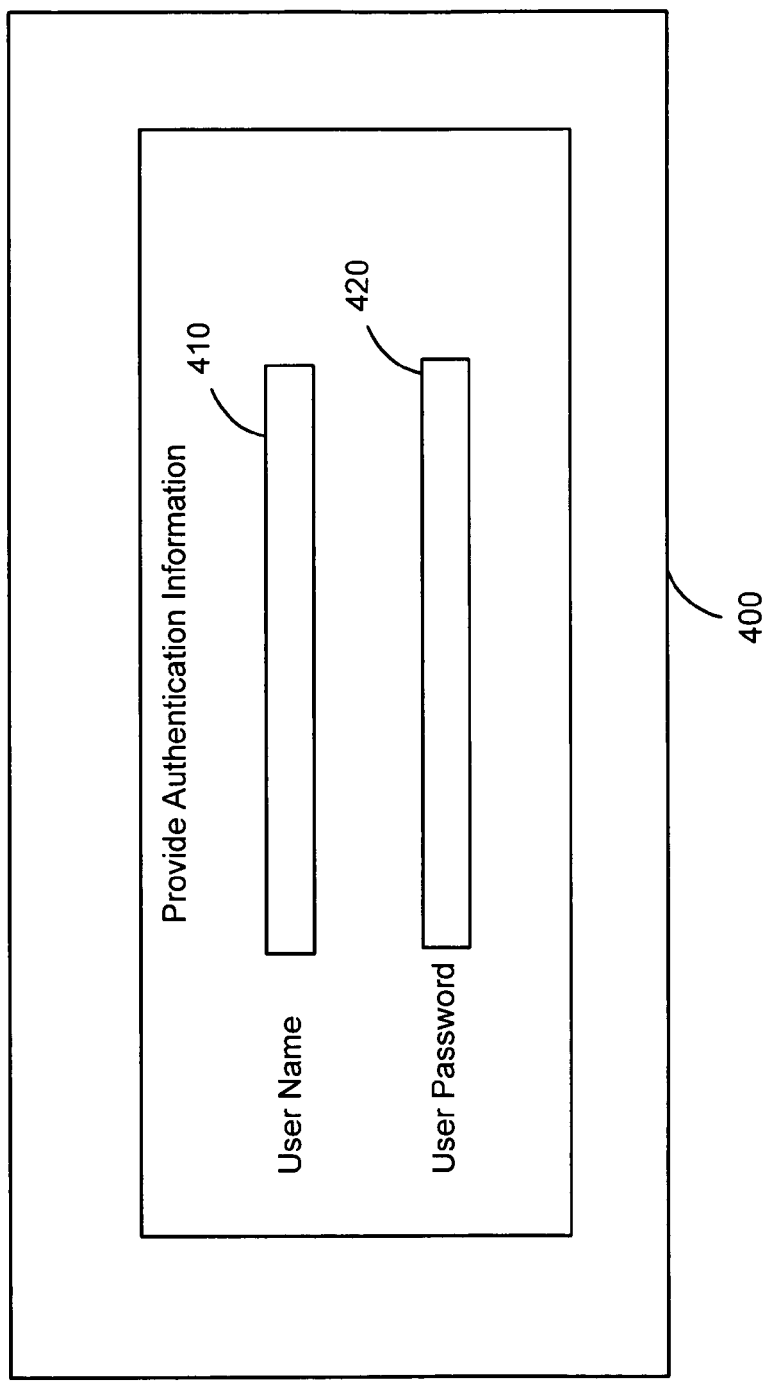
FIG. 4 is an exemplary user interface presented to a user prompting a user to provide authentication information.

Web server 240 listens 360 for web-based IP packets on port 80 and invokes web publishing service 245 executed on web server 240 to publish 360 an authentication web page, such as the one shown in FIG. 4. Authentication web page 400 includes various data fields, such as a user name field 410 and a password field 420 to which the user can provide authentication information.

Referring again to FIG. 3, the page is provided 370 to a user of the client device 110. When a user is presented with the authentication web page 400, the user provides 380 authentication information, such as a user name and password. DHCP security agent 220 receives 385 user authentication information and invokes directory connector 250 to connect to domain controller 260. DHCP security agent 220 provides the received authentication information to domain controller 260. Domain controller 260, in turn, checks 385 active directory 270 to determine whether the received authentication information corresponds to authentication information stored in active directory 270. Domain controller 260 sends to DHCP security agent 220 an indication as to whether it succeeded in finding the authentication information in active directory 270.

If the authentication information is stored in active directory 270, then the user's client device 110 is authenticated, and the DHCP security agent 220 sends 390 a web page that includes a set of commands for a user to refresh the client device 110 and release the fictitious IP address, as shown in FIG. 5. Referring now to FIG. 5, an exemplary web page 500 is presented 390 to the user. The MAC address of the authenticated client device 110 is added 394 to database module 230. The web page provides the steps for the user to release the fictitious IP address and request an actual IP address.

After the fictitious IP address has been released, the user of the client device 110 executes a request 396 for a new IP address. Client device 110 sends 397 a request that includes the MAC address of the client device 110. DHCP server 130 listens 398 for the request and identifies the MAC address from the request. Since the MAC address of the client device 110 has already been added to database module 230, DHCP security agent invokes DHCP 210 to issue 398 an actual IP address to client device 110. The IP address block sent to client device 110 includes a netmask address, an address of a DNS server, a default gateway address, and an actual IP address of DHCP server 130. An exemplary actual IP address block sent by DHCP 210 is shown below:

IP address 10.3.0.65
Netmask address 255.255.255.0
Default Gateway address 10.3.0.1
DHCP Server address 10.3.1.10
DNS Server address 10.3.1.252

In the exemplary IP address block, the actual IP address is assigned to the requesting client device 110. The first three octets ("10.3.0") represent the address of the communication network 120. The last number ("65") is a host IP address of the client device 110. Similarly, the first three octets of the IP address of DHCP server 130 represent the address of the communication network 120. The last octet ("10") is a host IP address of DHCP server 130. As a result, a user can access network resources and the Internet 150.

Alternatively, if the user is not authenticated, DHCP security agent 220 communicates to a user of client device 110 that the user is not authenticated. As a result, an actual IP address is not sent to the client device 110 and the user of client device 110 is denied access to communication network 120 or the Internet.

Thus, a request originated from the client device is sent to a login authentication page at the DHCP server 130, rather than being routed to a DNS server that provides domain name resolution or other network resources. This prevents an authorized user from accessing communication network 120 or the Internet 150.

The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method performed by a dynamic host configuration protocol (DHCP) security agent executed on a DHCP server to authenticate a user of a client device prior to providing access to a communication network, the method comprising:
   receiving a request from the client device for an IP address, the request including a Media Access Control (MAC) address of the client device;
   determining whether the MAC address is known to the DHCP server;
   responsive to the MAC address not being known to the DHCP server, leasing to the client device, a fictitious IP address of the client device, a fictitious IP address of the DHCP server, and a fictitious IP address of the DHCP server as an address of a DNS servers wherein the fictitious IP address of the client device, the fictitious IP address of the DHCP server and the fictitious IP address of the DHCP server as an address of the DNS server identify the devices on a fictitious network, and wherein the fictitious IP address of the client device allows the device to route its requests only within the fictitious network;
   receiving a web request from the user of the client device at the DHCP server identified by the fictitious IP address of the DHCP server;
   providing an authentication page to the user;
   prompting the user to provide user authentication information; and
   responsive to authenticating the user, allowing the user to access the communication network.

2. The method of claim 1, further comprising:
   responsive to not authenticating the user at the client device, denying access to the communication network.

3. The method of claim 1, further comprising:
   responsive to the client device having a MAC address that is known to the DHCP server, sending an actual IP address to the client device.

4. The method of claim 1, further comprising:
   responsive to authenticating the user, sending, to the client device, a DNS address and an address of the DHCP server.

5. The method of claim 1, further comprising:
   sending a request to the client device to release the fictitious IP address of the client device responsive to authenticating the user.

6. A system executed on a DHCP server for authenticating a user of a client device prior to providing access to a communication network, the system comprising:
   a DHCP security agent configured to:
      receive a request from the client device for an IP address, the request including a Media Access Control (MAC) address of the client device,
      determine whether the MAC address is known to the DHCP server,
      responsive to the MAC address not being known to the DHCP server, send to the client device, a fictitious IP address of the client device, a fictitious IP address of the DHCP server, and a fictitious IP address of the DHCP server as an address of a DNS server, wherein the fictitious IP address of the client device, the fictitious IP address of the DHCP server and the fictitious IP address of the DHCP server as an address of the DNS server identify the devices on a fictitious network, and wherein the fictitious IP address of the client device allows the device to route its requests only within the fictitious network;
      receive a web request from the user of the client device at the DHCP server identified by the fictitious IP address of the DHCP server;
      provide an authentication page to the user,
      prompt the user to provide user authentication information; and
      responsive to authenticating the user, allow the user to access the communication network; and
   a dynamic host configuration protocol configured to assign a fictitious IP address to the client device where the MAC address is not known to the DHCP server and to assign an actual IP address to the client device where the MAC address is known to the DHCP server.

7. The system of claim 6, further comprising:
   an active directory configured to store user authentication information;
   a domain controller configured to receive user authentication information from the DHCP security agent and to search the active directory to determine whether the provided user authentication information in stored in the active directory.

8. The system of claim 6, further comprising:
   a database module configured to store MAC addresses of client devices authorized to gain access to the network.

9. The system of claim 6, wherein the DHCP security agent is further configured to deny access to the communication network, in response to not authenticating the user at the client device.

10. A computer program product comprising a computer-readable medium having computer program code embodied therein for to authenticating a user of a client device prior to providing access to a communication network, the computer program code when executed by a computer system causing the computer system to:

receive a request from the client device for an IP address, the request including a Media Access Control (MAC) address of the client device;

determine whether the MAC address is known to the DHCP server;

responsive to the MAC address not being known to the DHCP server, lease to the client device, a fictitious IP address of the client device, a fictitious IP address of the DHCP server, and a fictitious IP address of the DHCP server as an address of a DNS server, wherein the fictitious IP address of the client device, the fictitious IP address of the DHCP server and the fictitious IP address of the DHCP server as an address of the DNS server identify the devices on a fictitious network, and wherein the fictitious IP address of the client device allows the device to route its requests only within the fictitious network;

receive a web request from the user of the client device at the DHCP server identified by the fictitious IP address of the DHCP server;

provide an authentication page to the user;

prompt the user to provide user authentication information; and responsive to authenticating the user, allow the user to access the communication network.

11. The computer program product of claim 10, wherein the computer system further denies access to the communication network in response to not authenticating the user at the client device.

12. The computer program product of claim 10, wherein the computer system further sends an actual IP address to the client device responsive to the client device having a MAC address that is known to the DHCP server.

13. The computer program product of claim 10, wherein the computer system further sends, to the client device, a DNS address and an address of the DHCP server responsive to authenticating the user.

14. The computer program product of claim 10, wherein the computer system further sends a request to the client device to release the fictitious IP address of the client device responsive to authenticating the user.

15. A system executed on a DHCP server for authenticating a user of a client device prior to providing access to a communication network, the system comprising:

means for
receiving a request from the client device for an IP address, the request including a Media Access Control (MAC) address of the client device, determining whether the MAC address is known to the DHCP server, responsive to the MAC address not being known to the DHCP server, sending to the client device, a fictitious IP address of the client device, a fictitious IP address of the DHCP server, and a fictitious IP address of the DHCP server as an address of a DNS server, wherein the fictitious IP address of the client device, the fictitious IP address of the DHCP server and the fictitious IP address of the DHCP server as an address of the DNS server identify the devices on a fictitious network, and wherein the fictitious IP address of the client device allows the device to route its requests only within the fictitious network, receiving a web request from the user of the client device at the DHCP server identified by the fictitious IP address of the DHCP server, providing an authentication page to the user, prompting the user to provide user authentication information; and responsive to authenticating the user, allowing the user to access the communication network; and means for assigning a fictitious IP address to the client device where the MAC address is not known to the DHCP server and for assigning an actual IP address to the client device where the MAC address is known to the DHCP server.

* * * * *